(12) United States Patent
Desoutter et al.

(10) Patent No.: US 10,906,227 B2
(45) Date of Patent: Feb. 2, 2021

(54) FORMING STATION FOR FORMING A CONTAINER FROM A PREFORM COMPRISING A VIBRATORY STRETCH ROD

(71) Applicant: DISCMA AG, Hunenberg (CH)

(72) Inventors: Luc Desoutter, Octeville-sur-Mer (FR); Guy Feuilloley, Octeville-sur-Mer (FR)

(73) Assignee: Discma AG, Zürich (CH)

( * ) Notice: Subject to any disclaimer, the term of this patent is extended or adjusted under 35 U.S.C. 154(b) by 457 days.

(21) Appl. No.: 15/739,499

(22) PCT Filed: Jun. 24, 2016

(86) PCT No.: PCT/EP2016/064730
§ 371 (c)(1),
(2) Date: Dec. 22, 2017

(87) PCT Pub. No.: WO2016/207386
PCT Pub. Date: Dec. 29, 2016

(65) Prior Publication Data
US 2018/0178437 A1    Jun. 28, 2018

(30) Foreign Application Priority Data

Jun. 25, 2015 (EP) .................................... 15306003

(51) Int. Cl.
*B29C 49/12* (2006.01)
*B29C 49/46* (2006.01)
(Continued)

(52) U.S. Cl.
CPC .............. *B29C 49/12* (2013.01); *B29C 49/06* (2013.01); *B29C 49/4273* (2013.01);
(Continued)

(58) Field of Classification Search
CPC ....................................................... B29C 49/12
See application file for complete search history.

(56) References Cited

U.S. PATENT DOCUMENTS 5,254,298 A     10/1993  Ibar
2014/0157726 A1  6/2014  Clussarath et al.

FOREIGN PATENT DOCUMENTS

| CA | 2277660 A1 | 1/2001 | |
| JP | 57142328 A * | 9/1982 | ............. B29C 49/06 |
| WO | 95/22447 | 8/1995 | |

* cited by examiner

*Primary Examiner* — Timothy Kennedy
(74) *Attorney, Agent, or Firm* — Eric J. Sosenko; Jonathan P. O'Brien; Honigman LLP

(57) ABSTRACT

A forming station comprising a source of pressurized forming fluid, and an injection device comprising an inlet, in fluidic communication with the source of pressurized forming fluid, and an outlet in fluidic communication with the inlet and through which the forming fluid is intended to be injected in the preform and further comprising a stretch rod movable in translation according to the axis of the stretch rod relative to the outlet and arranged to assist the axial deformation of the preform during a stretching phase. The forming station further comprises a vibratory device connected to the stretch rod, arranged to vibrate the stretch rod when said vibratory device is actuated, and a control device arranged to actuate the vibratory device during at least a part of the stretching phase.

16 Claims, 7 Drawing Sheets

(51) Int. Cl.
*B29C 49/42* (2006.01)
*B29C 49/06* (2006.01)
B29K 67/00 (2006.01)
B29L 31/00 (2006.01)

(52) U.S. Cl.
CPC ...... *B29C 49/46* (2013.01); *B29C 2049/4664* (2013.01); *B29C 2049/4694* (2013.01); *B29C 2791/008* (2013.01); *B29K 2067/003* (2013.01); *B29L 2031/7158* (2013.01)

FORMING STATION FOR FORMING A CONTAINER FROM A PREFORM COMPRISING A VIBRATORY STRETCH ROD

TECHNICAL FIELD OF THE INVENTION

The present invention relates to a forming station for forming a container from a preform by injecting a forming fluid in said preform.

The invention also relates to a method for forming a container from a preform and to a method for suppressing foam from the neck of a container using such a forming station. The invention also relates to a method for cleaning such a forming station.

In the application, "liquid" has a physical meaning. It designates any incompressible and able to flow medium. The liquid can have a low viscosity (like water or alcohol), a medium viscosity (like edible oil or soup), or a high viscosity (liquid detergent, soap, shampoo, ketchup, mustard). The liquid can be homogeneous or not homogeneous (including fruit pulp or bits of foodstuff), it can be Newtonian or non-Newtonian. It is not limited to foodstuff. The incompressible liquid may be for example water, or other beverages, foodstuff such as ketchup, mayonnaise, edible oil, yogurts, home or personal care products, medical fluids, fuels, hydraulic oil, operating fluids, and the like.

BACKGROUND

For forming a container, it is known to use a pressurized forming fluid, such as a gas when the container is blows or a liquid in the case of hydroforming, injected inside a preform placed in a mold to shape a container according to the shape of the mold.

For allowing the deformation of the preform into a container, the preform is heated at a temperature greater than the glass transition temperature and lower than the crystallization temperature of the material of the preform such that the preform is placed in a malleable state and is able to expand up to the shape of the container to be produced.

The liquid injected in the preform is generally injected at a temperature lower than the glass transition temperature. The temperature of the injected liquid is for example the ambient temperature, typically from 5° C. up to 50° C. while the glass transition temperature is for example over 75° C. for PET. Consequently, the liquid causes a rapid quenching of a very thin section of the inner walls of the preform during the injection of the liquid, generating a huge shear of temperature gradient with the outer wall of the preform.

Therefore, during the deformation of the preform while the container is not fully shaped, if the container is cooled down to a temperature under the glass transition temperature, the material of the container is no longer malleable and it is possible that the container can no longer be expanded up to the wanted shape or that the obtained container having a part deformed at a temperature below the glass transition temperature is not satisfactory in terms of mechanical and/or thermal resistance and/or in terms of gas permeability.

In order to solve this issue, the temperature of the preform can be increased such that the moment at which the temperature of the material of the container becomes inferior to the glass transition temperature is delayed in order for this moment to occur after the time needed to completely shape the container.

However, increasing the heating temperature of the preform close to the crystallization temperature has several drawbacks.

The heating of the preform at a high temperature releases the internal stress in the material of the preform which can cause an unwanted deformation of the preform prior to its shaping into a container. This deformation is for example a bending of the preform, known as the "banana effect" and/or a height variation of the preform. Such an unwanted deformation of the preform can lead to a malformation of the container which is susceptible of bursting inside the mold in which the container is produced or when the container is filled with liquid, either after its forming in case of air blowing or during its forming in case of hydroforming. Furthermore, the heating of the preform at a higher temperature implies a greater energy consumption, which impairs the energy balance of the machine.

US-2014/157726 discloses a hydroforming method using a sensor unit, which can be arranged to vibrate the wall of the preform during the injection of liquid such that the characteristics of the vibrations are captured to determine if a container is leaking or if a burst of the container has occurred.

WO-95/22447 discloses a mold unit comprising a vibrating wall arranged to vibrate the material of the container applied against the wall, meaning that the vibrations occur after the forming of the container, once the container is already shaped and in contact with the wall of the mold. The vibrations are arranged to improve the physical properties of the molded container.

However, these documents do not address to problem of the temperature of the wall of the preform during the forming step.

One of the aims of the invention is to solve the above-mentioned drawbacks by proposing a forming station allowing the container to be properly shaped while reducing the need to overheat the preform.

SUMMARY OF THE INVENTION

To this end, the invention relates to a forming station for forming a container from a preform by injecting a forming fluid in said preform, said forming station comprising:
- a source of pressurized forming fluid,
- a injection device comprising an inlet, in fluidic communication with the source of pressurized forming fluid, and an outlet in fluidic communication with the inlet and through which the forming fluid is intended to be injected in the preform,
- a stretch rod movable in translation according to the axis of the stretch rod relative to the outlet and arranged to assist the axial deformation of the preform during a stretching phase, wherein the forming station further comprises a vibratory device connected to the stretch rod, arranged to vibrate the stretch rod when said vibratory device is actuated, and a control device arranged to actuate the vibratory device during at least a part of the stretching phase.

The forming station according to the invention comprises a stretch rod which can be vibrated at different moments during the forming of the container. By vibrating the stretch rod when said stretch rod is in contact with the wall of the preform during the stretching phase, the vibrations of the stretch rod are transmitted to the wall of the preform, thereby bringing additional energy to the preform, the vibrational energy being converted into heat in the wall of the preform because the vibrations resonate with the molecular chains in the material of the preform, which results in internal frictions of the molecular chains causing a heating of the preforms. Consequently, the preform does not have to be overheated prior to the forming step, which reduces the energy consumption and the risks of bursting. Furthermore, the stretch rod, which is a rigid solid rod, transmits the vibrating energy in an optimal manner. Consequently, energy is transmitted with little dissipation in the stretch rod. The stretch rod can be vibrated during other phases of the forming and/or filling of the container for various purposes, as will be described subsequently.

According to other features of the forming station according to the invention:

the forming station further comprises a mold defining a mold cavity having the shape of the container to be formed, said mold being arranged to receive the preform such that the preform acquires the shape of the mold cavity when the pressurized forming fluid is injected in said preform, the stretch rod being movable inside the mold cavity during the stretching phase the vibratory device is a piezoelectric actuator mechanically coupled to or attached to the stretch rod, the control device controlling the actuation of the piezoelectric actuator and the vibration frequency and/or the vibration amplitude of the piezoelectric actuator, the forming station is also a liquid filling station, wherein the source of pressurized forming fluid is a source of pressurized liquid comprising a source of liquid and pressurizing means located downstream the source of liquid arranged to pressurize the liquid from the liquid source, a liquid injection circuit connecting the pressurizing means to the outlet, the outlet of the injection device being at the downstream end of the liquid injection circuit, the forming station further comprises an additional vibratory device comprising a vibrating part extending in the liquid injection circuit, such that said vibrating part is in contact with the pressurized liquid flowing in the liquid injection circuit.

The additional vibratory device can be used in addition to the vibratory stretch rod to bring energy to the wall of the preform when said preform is full of liquid. The liquid injected in the preform is a very simple medium usable to transmit the vibrations to the wall of the preforms from the structure of the station for forming the container. The vibrations are applied to the inner wall of the preform, which is the wall that is rapidly cooled down by the liquid. Therefore, energy can be brought to the wall of the preform even when the stretch rod is retracted from the preform.

Advantageously, the vibration frequency of the vibratory device and/or of the additional vibratory device is selected to minimize energy absorption by the injected liquid and to maximize energy absorption by the preform material.

According to another aspect, the invention relates to a method for forming a container from a preform using a forming station, said method comprising the steps of:

placing a preform in a malleable state in fluidic communication with the outlet of the forming station, the axis of the preform being substantially aligned with the axis of the stretch rod, moving in translation the stretch rod relative to the outlet according to an axial direction during a stretch rod displacement step; the axial direction being defined by the axis of the stretch rod; the stretch rod displacement step including an approaching phase ending when the stretch rod contacts a bottom wall of the preform, followed by a stretching phase during which the stretch rod expands the preform according to the axial direction, injecting the forming fluid in the preform through the outlet to expand the preform until it acquires the shape of the container to be formed, wherein the vibratory device is actuated at least during a part of the stretching phase such that the vibrations of the stretch rod are communicated to the preform resulting in heating the preform or in reducing a cooling speed of the preform.

As mentioned previously, using the stretch rod to vibrate the wall of the preform allows heating the preform or reducing the cooling speed of the preform such that the forming of the container can occur at an appropriate temperature.

According to other features of the method according to the invention:

the movement of the stretch rod during the stretching phase ends when the bottom wall of the preform contacts a bottom wall of the mold cavity, the control device ending the actuation of the vibratory device when said bottom wall of the preform contacts said bottom wall of the mold cavity.

the pressurized forming fluid is a liquid, and said injecting the pressurized forming fluid comprises a low pressure injection phase wherein liquid is injected inside the preform at a first pressure until the preform acquires an intermediary shape and high pressure injection phase occurring after the low pressure injection phase wherein liquid is injected inside the preform having the intermediary shape at a second pressure until the preform acquires the final shape of the container to be formed, the second pressure being greater than the first pressure.

the low pressure injection phase occurs until the intermediary shape presents a volume corresponding to between 90% and 98% of the volume of the container to be shaped, the high pressure phase occurring such that the volume of the intermediary shape further increases by 2% to 10% of said volume of the container to be shaped in order to obtain the final shape of the container.

the additional vibratory device is actuated during at least a part of the low pressure injection phase such that the vibrations of the additional vibratory device are communicated to the preform by the liquid resulting in the heating of the preform or in reducing a cooling speed of the preform.

the additional vibratory device is actuated during at least a part of the high pressure injection phase such that the vibrations of the additional vibratory device are communicated to at least to the part of the preform body not already urged against the mold cavity.

By vibrating the wall of the preform during the high pressure injection phase, energy is brought to the wall of the container when said energy is most needed. Indeed, the high pressure injection phase is performed to complete the shaping of the container at the end of the injection step when the container has already been cooled down during the low pressure injection phase. Consequently, bringing energy to the wall of the container allows compensating the cooling down of the container due to the low pressure injection phase. Furthermore, the high pressure phase takes place when the container is almost full of liquid at a lower flow rate than during the low injection phase. At this lower flow rate, the appearance of cavitation in the liquid is reduced which improves the propagation of the vibrations in the liquid and therefore the energy transfer to the wall of the container. The shaping of the container can therefore easily be completed during the high injection phase with the energy supply provided by vibrating the wall of the container.

According to another feature of the method according to the invention, the low pressure injection phase starts during the stretching phase, the additional vibratory device being actuated at the end of the stretching phase once the actuation of the vibratory device connected to the stretch rod has stopped or being actuated while the vibratory device connected to the stretch rod is still actuated.

Bringing energy to the preform in a continuous manner by using both the vibratory device vibrating the stretch rod and the additional vibratory device allows maintaining the cooling speed at a satisfactory value such that the temperature of the preform is maintained over the glass transition temperature until the container is fully shaped.

According to another aspect, the invention relates to a method for suppressing foam from the neck of a container using a forming station wherein the pressurized forming fluid is a liquid, and said injecting the forming fluid simultaneously fills the formed container, the method comprising an end step, wherein the outlet of the injection device is retrieved from the formed container at the end of the injection step, wherein the vibratory device is actuated during said end step.

Depending on the liquid injected in the container, foaming of said liquid can occur at the end of the forming step. For example, a carbonated liquid, containing gas bubbles, is susceptible of foaming. Such a foaming can lead to a spilling of the liquid out of the container. In this case, the liquid soils the mold of the forming station, which has to be stopped and clean, which reduces the throughput of the forming station. The stretch rod can be used to vibrate the air above the foam, which destroys the gas bubbles and causes the foaming to stop. Vibrating the air above the container is conventionally performed by a vibratory device located downstream of the forming station, which requires more space and delays the "de-foaming" operation compared with the method of the invention.

According to another feature of the method according to the invention, the vibratory device is actuated while the stretch rod remains in the liquid filling the container and/or is actuated when the stretch rod comes out of the liquid.

According to another aspect, the invention relates to method for cleaning a forming station, comprising a step of placing the inlet in fluidic communication with a cleaning liquid source and the outlet in fluidic communication with a cleaning liquid collecting container and a cleaning step of circulating the cleaning liquid in the liquid injection circuit, wherein the vibratory device and/or the additional vibratory device are actuated during at least part of the cleaning step.

The forming station described above can be easily cleaned with the assistance of the vibratory device combined with the circulation of cleaning products in the forming station. Indeed, the vibratory device can be used to detach adhering materials from the wall of the liquid injection circuit by vibrating the cleaning products while said cleaning products flow against said wall. For the cleaning step, the vibration frequency may be selected to optimize such detaching, which is obviously different from the frequency used during other steps of the forming and filling method.

Advantageously, the forming and filling station may include several vibratory devices, each one being optimized for a particular phase of the station life.

BRIEF DESCRIPTION OF THE DRAWINGS

Other aspects and advantages of the invention will appear upon reading the following description, given by way of example and made in reference to the appended drawings, wherein.

DETAILED DESCRIPTION OF THE INVENTION

Figure 1:
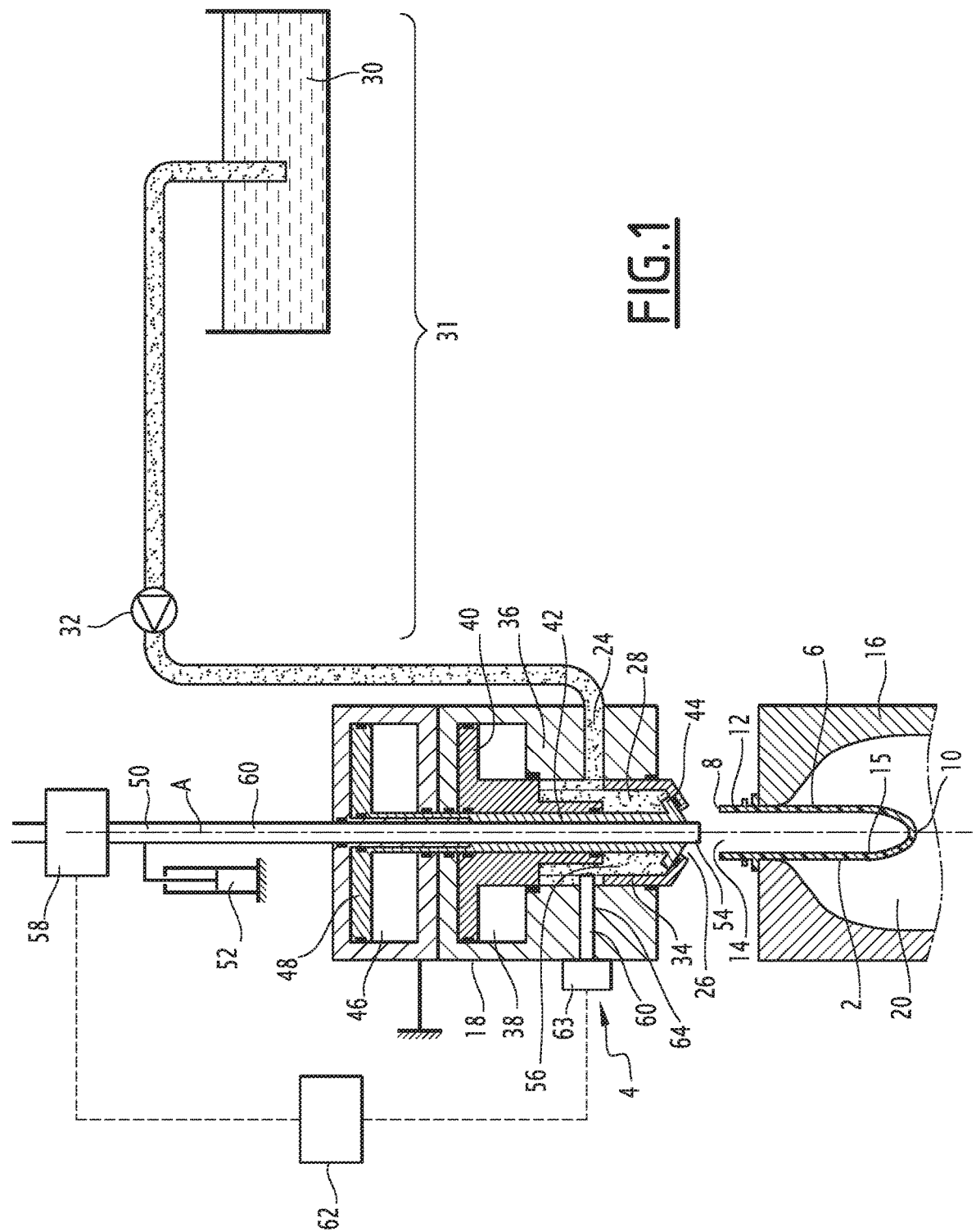
FIGS. 1 to 6 are diagrammatical cross-section views of part of a forming station carrying a preform at various steps of the forming step of the method according to the invention.

In the following description, the terms "upper" and "lower" are defined relative to axis A, which corresponds to the axis of the container to be produced and which extends substantially vertically when the container is placed on its bottom.

The invention relates to the technical field of forming containers 1, such as bottles, for example beverage bottles containing water, carbonated water, carbonated soft drinks, Juices, Teas, energy drinks, alcoholic, non-alcoholic drinks or other type of liquids, such as personal or home care products, pharmaceutical, viscous food and non-food products such as for example and not limited to edible oil, ketchup, yoghurts, motor oil.

The invention can be applied in the field of "air blowing", wherein containers are formed by injecting a pressurized gas in preforms 2, as well as in the field of "hydroforming", wherein containers are formed by injection a pressurized liquid in the preforms 2. Since the air blowing technique is well known and conventional, the following description will be made with reference to the hydroforming technique. It should be noted however that the invention is not limited to said hydroforming technique and can easily be applied to the air blowing technique.

The invention relates to a forming and filling station 4, which is a part of a forming machine for producing a container 1 from a preform 2.

The machine is arranged to receive successive preforms 2, each made of a thermoplastic material. The thermoplastic material is for example chosen among the polyesters, such as polyethylene terephthalate (PET), polyethylene naphthalene (PEN), polyethylene imine (PEI), polytrimethylene terephthalate (PTT), polylactic acid (PLA), polyethylene furanoate (PEF), or polyolefins, such as polyethylene low density (LDPE) or high density (HDPE), polypropylene (PP), or styrene based materials such as polystyrene (PS), or other polymers, such as polyvinyl chloride (PVC) or a mix of these materials.

Figure 2:
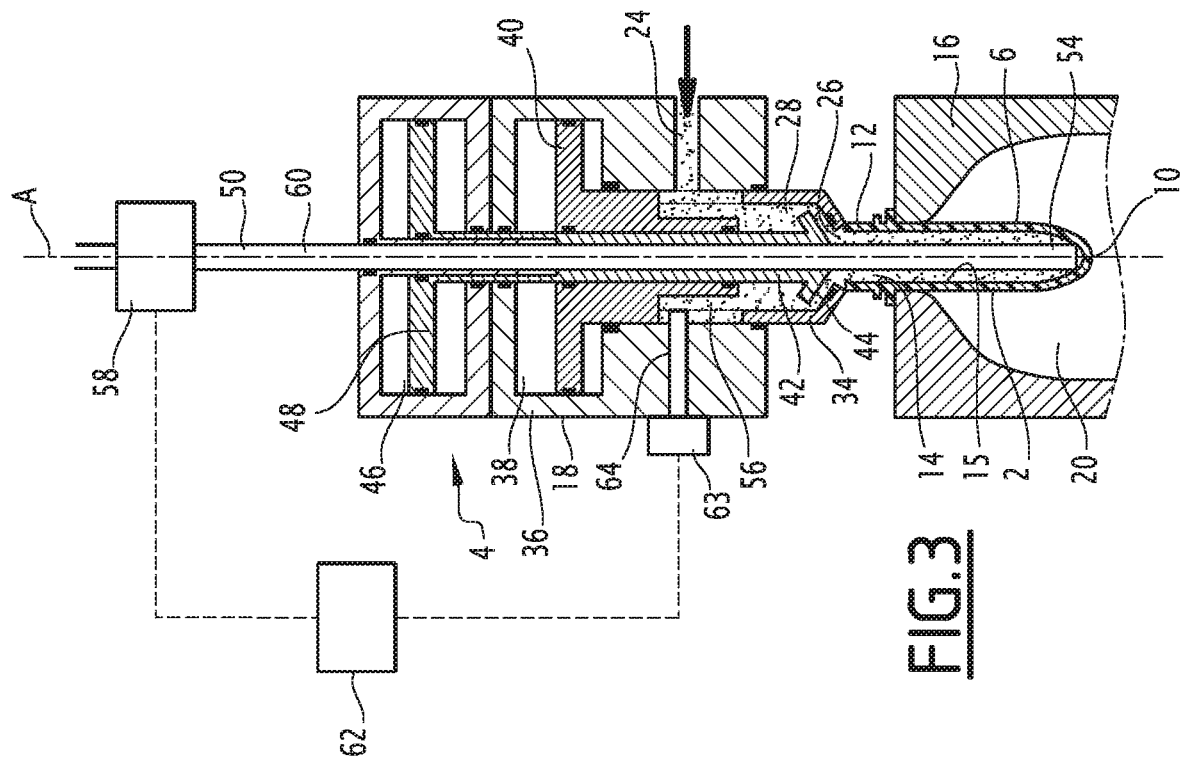

Each preform 2 has for example the general shape of a test tube. Consequently, each preform 2 comprises a body 6 having the shape of a tube extending along a longitudinal axis A and having a U shape in longitudinal cross-section, i.e. in an axial plane containing the longitudinal axis A, as shown in FIG. 2. The preforms 2 have an open extreme part 8 and, at the other end, a closed extreme part 10. The open extreme part 8 has for example the final shape of the neck 12 of the container to be shaped, meaning that the shape of the neck 12 will not be modified during the container forming process. The neck 12 defines an inner opening 14 extending along the longitudinal axis A and delimited by a wall with an external face for example provided with a thread allowing the container 1 to receive a cap by screwing. The closed extreme part 10 has for example a hemispherical shape. The above described shape is given as a non-restricting example and other shapes can be foreseen, for example another shape of the neck, without a thread, comprising or not an outer shoulder extending radially substantially perpendicular to the longitudinal axis A. The inner volume of the preform 2 is delimited by an inner wall 15 of the preform.

In the following description, the term "preform" is used for the preform in their initial shape as well as for the preform during their deformation into a container.

The preforms 2 can be produced at another location than the location of the forming machine, such that the preforms are stored and shipped together to the location of the machine.

The preforms are then successively loaded in the machine and transferred to a heating station. The heating station is conventional and will not be described in detail herein. The heating station is arranged to heat each of the successive preforms at a temperature comprised between the glass transition temperature and the crystallisation material of the thermoplastic material of the preform 2 such that the preforms 2 are placed in a malleable state in which they are able to be deformed under the influence of a pressure injected inside said heated preforms 2. Alternatively, the preforms 2 can be produced at the same location than the location of the forming machine such that the injected preforms are transferred to the inlet of the forming machine. This allows reducing the energy required for heating the preforms before the forming step.

Each heated preform 2 is then transferred, for example by means of a transfer wheel, to a forming and filling station 4.

The forming and filling station 4 is for example carried by a forming wheel rotating around a first axis substantially parallel to the longitudinal axis A. The forming and filling step, which will be described subsequently, can then be carried out during the rotation of the forming station 4, which allows forming and filling several preforms 2 at the same time by providing several forming stations 4 on the wheel.

Each forming and filling station 4 comprises a mold 16 arranged to receive a preform 2 and an injection device 18 arranged to inject a forming liquid in the preform 2 received by the mold 16, as shown in FIGS. 1 to 5. Apart from the vibratory device(s) and for the means for controlling said vibratory device(s), which will be described subsequently, such a forming and filling station 4 is conventional for a hydroforming machine.

Figure 4:
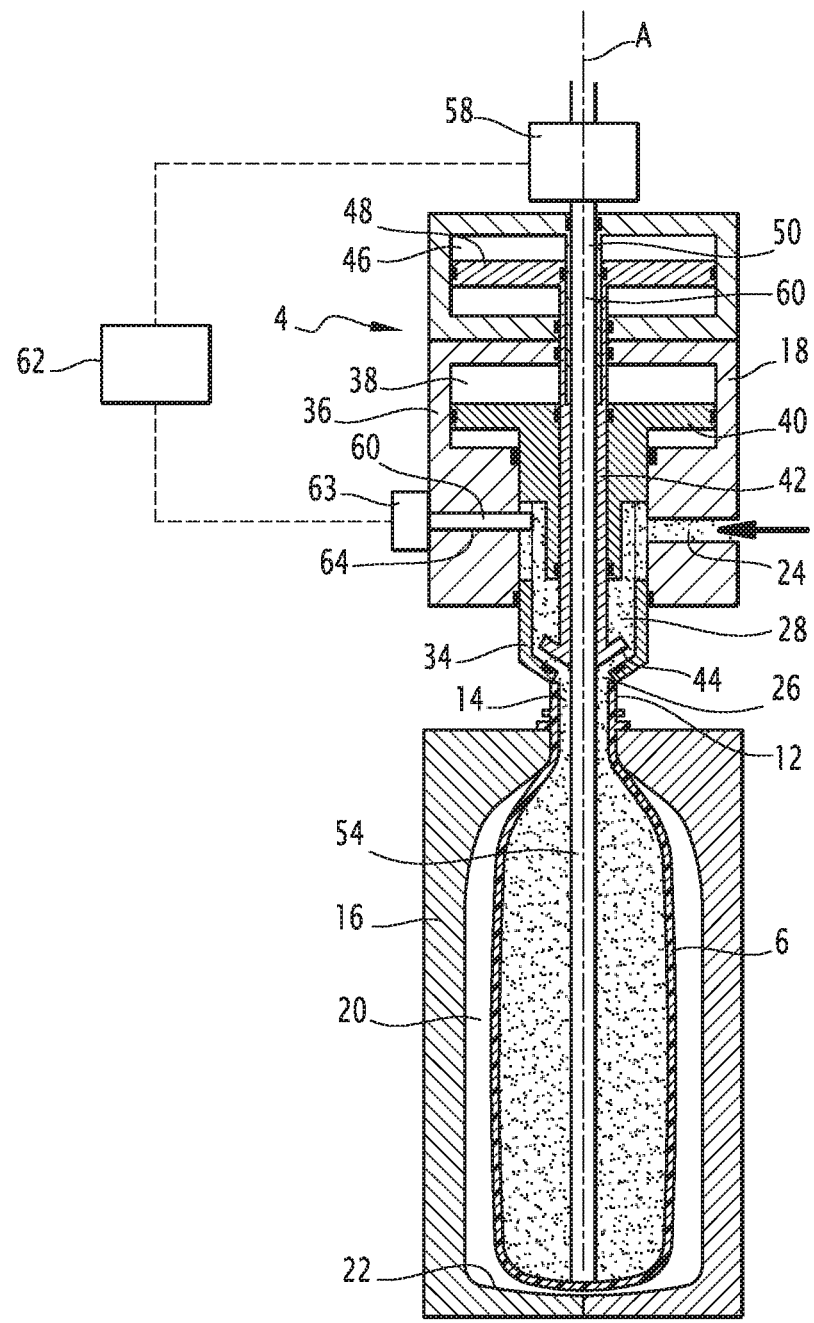
Figure 5:
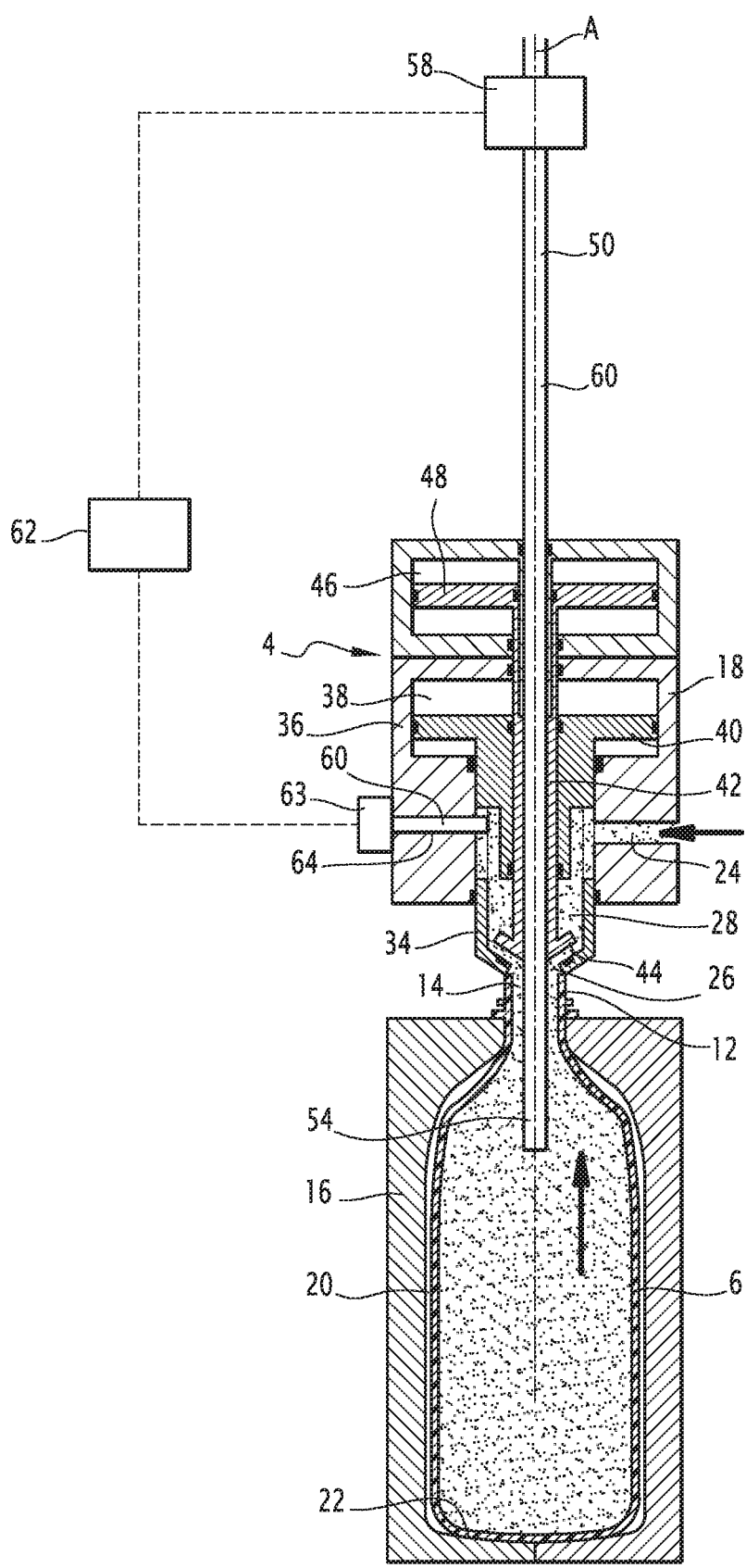
Figure 6:
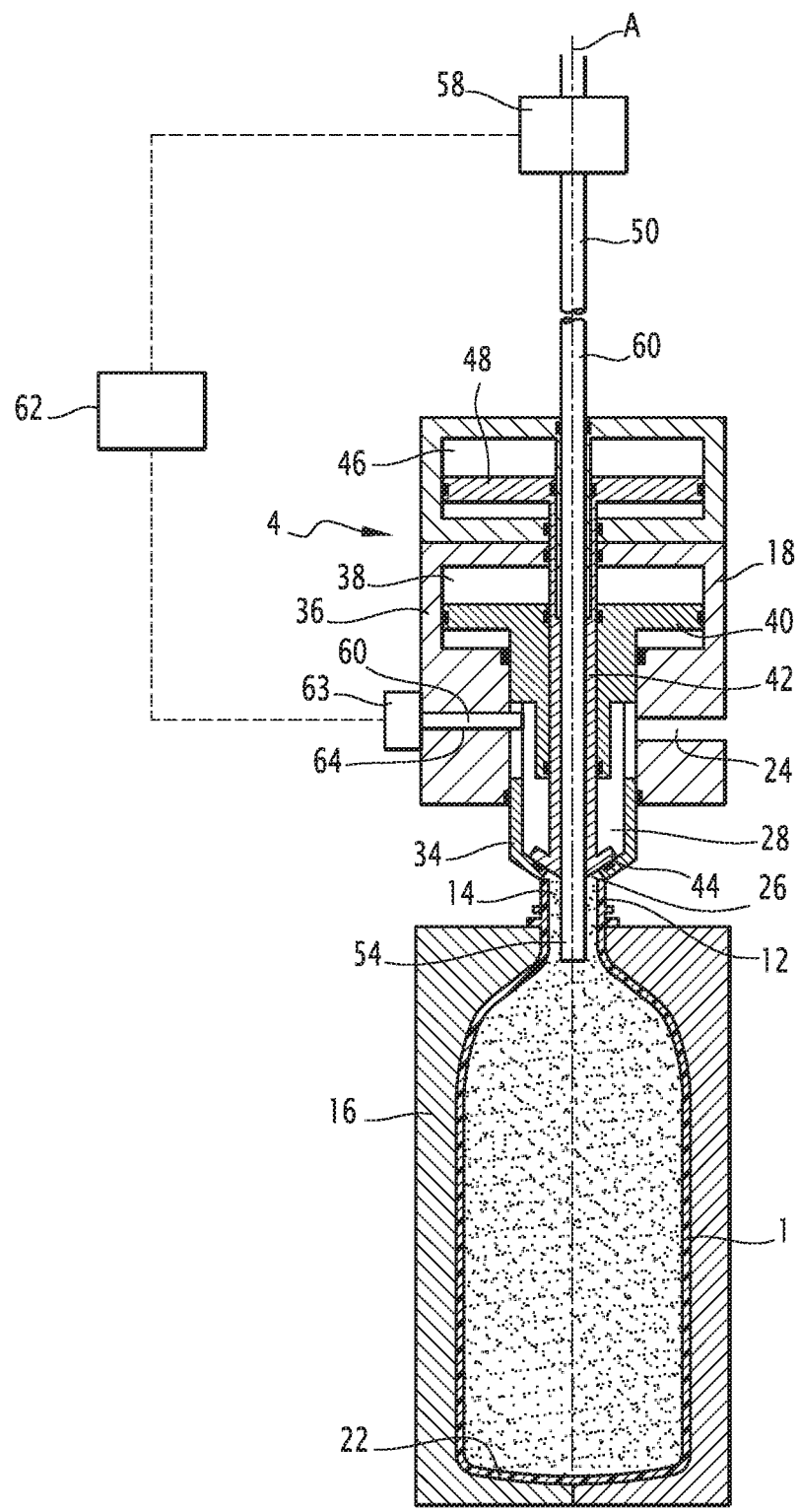

The mold 16 defines a mold cavity 20 having the shape of the container 1 to be produced. The mold 16 comprises for example at least two parts movable relative to each other, between an opened position and a closed position. The two parts are for example hinged together and are movable in rotation relative to each other around an axis substantially parallel to the axis A of the preform 2. Each part of the mold 16 comprises a body comprising a hollow recess having the shape of a half bottle to be formed. According to a non-limiting example, the hollow recess of one part comprises a semi-cylindrical portion, closed at its lower end by a bottom surface having a the shape of a semi-circle, and terminated at its upper end by a tapered, then semi-cylindrical collar of a shape substantially complementary to the shape of half of the body 6 of the preform 2. The hollow recess of the other part of the mould is symmetrical to the hollow recess described above. In the opened position, the parts of the mold 16 are separated from each other such that the preform 2 can be introduced between the two parts. In the closed position, the two parts are applied against each other to form a main part, such that the hollow recesses face each other and define together the mold cavity 20 having the shape of the container 1 to be formed. The mold 16 could comprise more than two parts. Advantageously, a third part having the shape of the bottom of the container could be provided to define the mold cavity 20 with two parts having the shape of the body of the container. The third part defines the bottom 22 of the mold 16, as shown in FIGS. 4 to 6.

The injection device 18 for injecting the pressurized incompressible liquid in the preform 2 will now be described. The injection device 18 described herein and shown in the figures is an example of an injection device that can be used for hydro forming methods and it is to be understood that the method according to the invention can be used with any other kind of injection devices.

The injection device 18 comprises an inlet 24, an outlet 26 and a chamber 28 extending between the inlet 24 and the outlet 26 and placing the inlet 24 in fluidic communication with the outlet 28.

The inlet 26 is placed in fluidic communication with a forming fluid source, formed, in the case of hydroforming, by an incompressible forming liquid source 30, for example a water reservoir, via pressurization means 32 adapted for transferring the liquid from the liquid source 30 to the inlet 24 at at least one controllable predetermined pressure, and appropriate tubing extending between the inlet 24, the injection means 32 and the liquid source 30 Both the liquid source 30 and the pressurization means 32 constitute a pressurized liquid source 31. According to the embodiment shown in FIG. 1, the pressurization means 32 are formed by a pump. Alternatively or in combination, the pressurization means can also be formed by one or several conventional pistons or by other appropriate means allowing generating and/or controlling the pressure of the liquid injected in the preform. According to an embodiment, the pressure applied by the pressurization means is variable such that the liquid can be injected at different pressures in the preform 2.

The outlet 26 is adapted to be placed in liquid tight fluidic communication with the opening 14 formed by the neck 12 of the preform 2 held by the mold 16 of the forming and filling station 4, and therefore with the inner volume of the preform 2. By liquid tight fluidic communication, it is meant that when the outlet 26 is in fluidic communication with the inner volume of the preform 2, the liquid flows only in the inner volume of the preform 2 and not outside the preform 2.

The outlet 26 is for example formed by an opening of an injection nozzle 34. The outlet 26 is in fluidic communication with the chamber 28. The injection nozzle 34 is movable inside a housing 36 of the injection device 18, in translation along axis A between a retracted position (FIG. 1) and an active position (FIGS. 2 to 6). In the retracted position, the injection nozzle 34 leaves room under the injection device 18 to position a preform 2 in the mold 16 or to retrieve a formed container 1 from the mold 16. In the active position, the injection nozzle 34 is placed against the neck 12 of the preform 2 with a liquid tight contact between the injection nozzle 34 and the neck 12 of the preform 2, such that the outlet 26 of the injection nozzle 34 is in fluidic communication with the inner volume of the preform 2. The chamber 28 of the injection nozzle 34 for example comprises a hollow space including a regular cylindrical portion and a truncated cone or a pyramidal portion extending between the regular cylindrical portion and the outlet 26 of the injection nozzle. The diameter of the chamber 28 may reduce progressively from the diameter of the regular cylindrical portion to the diameter of the opening in the conical portion.

The housing 36 further comprises a first upper compartment 38 arranged to receive actuation means 40 for moving the injection nozzle 34. The actuation means 40 are for example pneumatic actuation means and for example comprise a piston, attached to the injection nozzle 34 and hermetically separating the first upper compartment 38 into an upper part and into a lower part, each able to be filled with air. For moving the injection nozzle 34 between its retracted position and its active position, air may be injected in the upper part of the first upper compartment 38 in order to increase the pressure in said upper part and to move the piston such that the volume of the upper part increases, while to volume of the lower part decreases. Conversely, for moving the injection nozzle 34 between its active position and its retracted position, air is injected in the lower part of the first upper compartment 38 in order to increase the pressure in said lower part and to move the piston such that the volume of the lower part increases, while to volume of the upper part decreases. The inner volume of the chamber 28 is hermetically isolated from the first upper compartment 38 by appropriate sealing means.

The injection device 24 further comprises a hollow control rod 42 extending in the chamber 28 along axis A. The hollow control rod 42 comprises at its lower end, extending in the chamber 28, a sealing ring 44. The sealing ring 44 has a shape which is complementary to the shape of part of the conical portion of the injection nozzle 34, such that, when the sealing ring 44 is applied against the wall of the conical portion, the sealing ring 44 closes hermetically the chamber 28 and prevents liquid from flowing through the outlet 26. The hollow control rod 42 is movable in translation along axis A in the chamber 28 between an injecting position, shown in FIGS. 3 to 5, wherein the sealing ring 44 is spaced from the wall of the conical portion of the injection nozzle and wherein the outlet 26 is in fluidic communication with the inlet 24 via the chamber 28, and a sealing position, shown in FIGS. 2 and 6, wherein the sealing ring 44 is applied against the wall of the conical portion of the injection nozzle 34 and hermetically closes the chamber 28.

The housing 36 further comprises a second upper compartment 46 arranged to receive actuation means 48 for moving the control rod 42. The actuation means are for example pneumatic actuation means and for example comprise a piston, attached to the control rod 42 and hermetically separating the second upper compartment 46 into an upper part and into a lower part, each able to be filled with air. For moving the control rod 42 between its injecting position and its sealing position, air is injected in the upper part of the second upper compartment 46 in order to increase the pressure in said upper part and to move the piston such that the volume of the upper part increases, while to volume of the lower part decreases. Conversely, for moving the control rod 42 between its sealing position and its injecting position, air is injected in the lower part of the second upper compartment 46 in order to increase the pressure in said lower part and to move the piston such that the volume of the lower part increases, while to volume of the upper part decreases. The first upper compartment 38 is hermetically isolated from the second upper compartment 46 by appropriate sealing means.

Alternatively, the injection nozzle 34 and/or the control rod 42 may be moved by an electrical motor, like a servomotor to better control the speed of and/or the force applied by the injection nozzle 34 or the control rod 42.

A stretch rod 50 extends inside the hollow control rod 42, passes through the outlet 26 and extends in the preform 2 to assist in the axial deformation of the preform 2 into a container, as known per se. The stretch rod 50 is movable in translation along axis A in the hollow control rod 42 and is actuated by appropriate actuation means 52, for example a servo motor or a magnetic actuation means.

The seal ring 44 forms a rigid sealing barrier extending between the injection means 32 and the outlet 26 when the hollow control rod 42 is in the closed position. The rigid sealing barrier comprises a port 54 formed by the opening extending through the hollow control rod in the vicinity of the seal ring 44. The stretch rod 50 is movable in a fluid tight manner through the port 54 thanks to appropriate sealing means extending between the hollow control rod 42 and the stretch rod 50. When the injection nozzle 34 is in the active position and the hollow control rod 42 is in the closed position, the rigid sealing barrier and the stretch rod 50 therefore delimit a fluid tight closed volume comprising the outlet 26 and the inner volume of the preform, the stretch rod 50 being able to be displaced in said closed volume in a fluid tight manner, as shown in FIGS. 2 and 6.

In the following description, the volume in which the liquid circulates in the injection device 18 is referred to as the liquid injection circuit 56 and the parts delimiting this volume define the wall of the liquid injection circuit 56, said wall of the liquid injection circuit being in contact with the liquid when the injection device 18 is full of liquid and/or is injecting liquid through the outlet. The liquid injection circuit 56 is consequently delimited by the inlet 24, the chamber 28, the hollow control rod 42 and the outlet 26. The wall of the liquid injection circuit 56 is defined by a part of the inner wall of the housing 36, the inner wall of the injection nozzle 34 and the outer wall of the hollow control rod 42. The liquid injection circuit connects the injection means 32 to the outlet 26 of the injection device 18, the outlet of the injection device 18 being located at the downstream end of the liquid injection circuit 56.

The injection device 18 further comprises a vibratory device 58 mechanically coupled to, or attached to the stretch rod 50 and arranged to make the stretch rod 50 vibrate.

Such a vibratory device 58 is for example formed by a piezoelectric actuator mechanically coupled and/or attached to a vibrating part 60, formed by the stretch rod 50, the piezoelectric actuator being arranged to make the vibrating part 60 vibrate when said piezoelectric actuator is actuated. Such a piezoelectric actuator is known. The vibratory device is controlled by a control device 62 allowing to set the frequency and the amplitude of the vibrations of the vibrating part 60 such that the frequency and/or the amplitude of the vibrations are tuneable. Advantageously, the control device 62 also forms or is connected to the control device(s) of the pressurization means 32 and of the actuation means 40, 48, 52 of the injection nozzle 34, of the control rod 42 and of the stretch rod 50 and such that the movements of these parts and the triggering of the vibrations can be synchronized as will be described below.

The vibratory device 58 therefore forms an exciter and the preform forms a resonator forming an oscillating system to which energy is brought by the vibratory device 58.

According to the embodiment shown in the figures, the forming station further comprises at least one additional vibratory device 63 having a vibrating part 60 extending in the liquid injection circuit 56 such that the vibrations of the vibrating part 60 are transmitted to the liquid flowing in the liquid injection circuit 56. As shown in the figures, the vibrating part 60 of the additional vibratory device 63 is for example formed by a rod passing in a fluid tight manner through a port 64 provided in the housing 36 and protruding inside the chamber 28. According to an embodiment, the vibrating part 60 can be isolated from the housing 36 in such a way that the vibration of the vibrating part 60 does not cause a vibration of the whole housing 36.

According to a variant, the vibrating part 60 of the additional vibratory device 63 can be formed by one of the part delimiting the liquid injection circuit 56 such that a part of the wall of the liquid injection circuit 56 is vibrated. This can be obtained for example by mechanically coupling the piezoelectric actuator to the injection nozzle 34 or to the hollow control rod 42 or to a part of the housing 36 facing the liquid injection circuit 56.

According to this embodiment, the control device 62 is arranged to control both the vibratory device 58 and the additional vibratory device 63. Using two vibratory devices increases the vibratory energy brought by the vibratory devices. Furthermore, using two vibratory devices can be advantageous in terms of space requirements since the size of each vibratory device can be reduced while producing the same energy as a single bigger vibratory device. Furthermore, with two vibratory devices, the shape of the waves of the vibrations can be better controlled for example by making the vibratory devices vibrate in phase or in phase opposition.

The method for forming and filling a container 1 using the forming station 4 described above will now be described.

A heated preform in a malleable state 2 is first placed in the mold 22 while the injection nozzle 34 is in the retracted position and the control rod 42 is in the closed position, as shown in FIG. 1.

The chamber 28 is filled with liquid from the liquid source 30 via the injection means 32 and the injection nozzle 34 moves in the active position to place the outlet 26 in fluidic communication with the neck 12 of the preform 2 while the control rod 42 remains in the closed position, as shown in FIG. 2.

The forming step of the method during which the preform 2 is shaped into a container then starts.

The forming step comprises a stretch rod displacement step, wherein the stretch rod 50 is actuated such as to move according to the longitudinal axis A. The stretch rod displacement step comprises an approaching phase wherein the stretch rod 50 is moved in the axial direction until the stretch rod 50 contacts the inner wall of the closed extreme part 10, or bottom, of the preform 2, as shown in FIG. 2.

Figure 3:
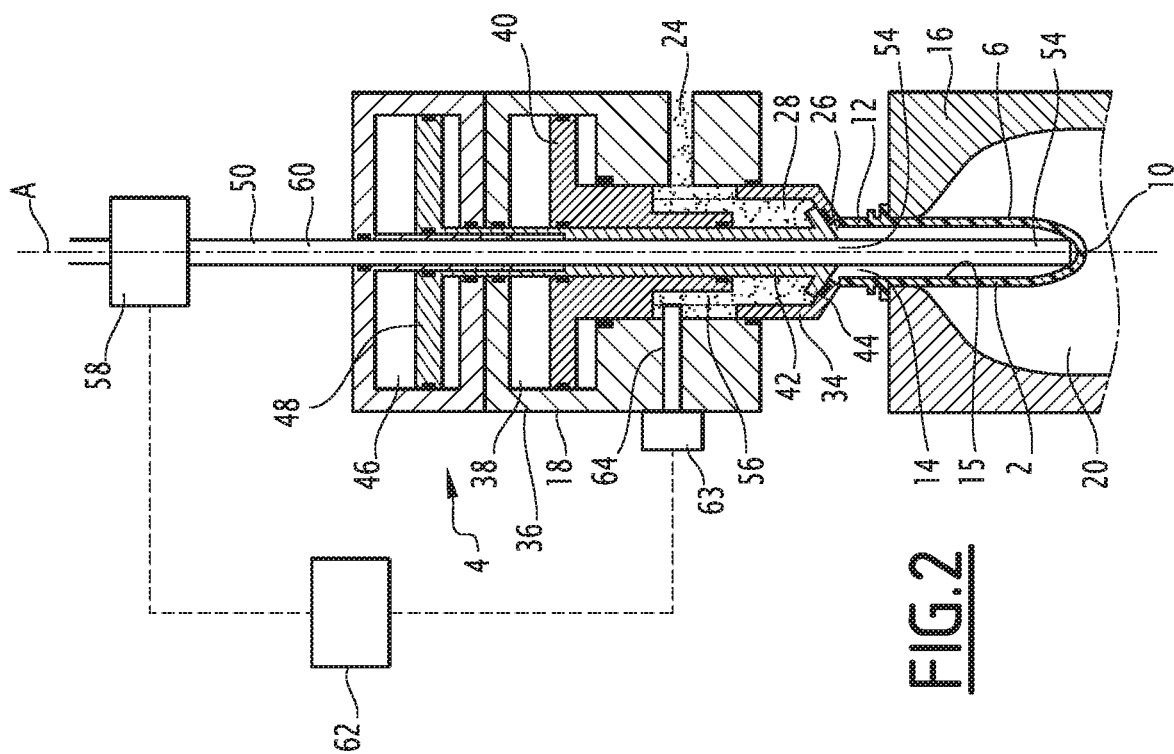

The stretch rod 50 is then further actuated, during a stretching phase, towards the bottom 22 of the mold 16 such that the preform 2 is stretched in the axial direction until the closed extreme part 10 of the preform 2 contacts the bottom 22 of the mold 16, as shown in FIGS. 3 and 4. The stretch rod 50 therefore assists in the axial expansion of the preform 2. The stretch phase is defined as the phase during which the stretch rod 50 applies a force in the axial direction on the closed extreme part 10 of the preform 2. The stretch phase ends when the closed extreme part 10 reaches the bottom 22 of the mold 16. The stretch rod 50 is than retracted as shown in FIG. 5.

The vibratory device 58 is used during at least a part of the stretching phase described above. This means that during a part of the stretching phase, the vibratory part 60 formed by the stretch rod 50 is vibrated, the vibrations being transmitted to the tip of the stretch rod 50 in contact with the inner wall of the closed extreme part 10 of the preform 2. Consequently, the vibrations of the stretch rod 50 are transmitted to the wall of the preform 2 and are converted in thermal energy in the wall of the preform 2. Indeed, the vibrations transmitted to the wall of the preform 2 are arranged to resonate with the internal molecule chains of the material of the preform such that said molecule chains are agitated, thereby creating internal frictions in the wall of the preform; which generates a heating of the wall of the preform. The frequency and the amplitude of the vibrations generated by the vibratory device 58 are therefore arranged such that said vibrations resonate with the internal molecule chains of the material of the preform. According to an example, the frequency of the vibrations is in the ultrasound range. In order to optimize the resonance with the internal molecule chains, the frequency of the vibrations is preferably close or equal to one of the natural vibration frequency of the wall of the wall of the preform 2.

Since the top of the mold 16 holds the neck 12 of the preform 2, the vibration of the stretch rod 50 causes the whole preform body 6 to vibrate. The vibration can start from the contact between the tip of the stretch rod 50 or at any time before or after the liquid injection starts. After the liquid injection starts, the stretch rod 50 may continue to vibrate the extreme part 10 of the preform and almost all the preform body 6.

The vibrating of the closed extreme part 10 of the preform 2 stops when the closed extreme part 10 of the preform 2 comes into contact with the bottom 22 of the mold 16.

The forming step comprises an injection step, wherein liquid is injected in the preform 2 through the outlet 26 of the injection device 18 such that the liquid expands the preform 2 up to the shape of the molding cavity 20, as shown in FIGS. 3 to 5.

The injection step starts with the displacement of the control rod 42 to its open position, as shown in FIG. 3, thereby placing the outlet 18 in fluidic communication with the chamber 28. The liquid in the chamber 28 is therefore injected in the preform 2 through the inner opening 14 of the neck 12. The liquid is injected at a first pressure $P_1$ imparted on the liquid by the injection means 32. The first pressure $P_1$ is for example comprised between 4 and 15 bars depending on the size and volume of the container to be produced. If a stretching phase occurs, the injection step can start during said stretching phase as shown in FIGS. 3 and 4.

According to an embodiment, the liquid is injected at the first pressure until the completion of the container 1, meaning the injection step takes place at a single pressure $P_1$.

According to another preferred embodiment, the injection at the first pressure is a low pressure injection phase and is followed by a high pressure injection phase wherein the pressure in the container is increased up to a second pressure $P_2$, greater than the first pressure $P_1$, to create a pressure peak in the container and complete the forming of the container. Indeed, it is known that the first pressure level might not sufficient to completely shape the preform into the container, meaning that, with the pressure applied to the preform, the preform acquires a shape which is not exactly the shape of the molding cavity and that an extra deformation is needed to completely urge the wall of the preform against the wall of the molding cavity. Shapes having locally a very small radius of curvature are very difficult to obtain. Applying a pressure peak during a short time allows finalizing the container. Such a pressure peak guaranties a good imprint of the shape of the molding cavity 20 on the container, in particular when ridges or embossed letters or logos must be reproduced on the external surface of the container wall.

The first pressure $P_1$ is for example applied until the preform has acquired an intermediary shape 66, which is not quite the shape of the container to be produced, as shown in FIG. 5. The intermediary shape 66 presents a volume, which is substantially comprises between 90% and 98% of the volume of the container 1 to be produced, meaning that the deformed preform has to be further deformed such that the volume increases by 2% to 10% for the container to be obtained. This increase in volume is obtained by applying the second pressure $P_2$. The second pressure $P_2$ is for example comprised between 20 and 80 bar. When the preform material is PET, the second pressure $P_2$ can be comprised between 20 and 50 bar, in particular between 35 and 40 bar. The change in pressure is for example applied by changing the pressure of the liquid via the injection means 32 during the injection of the liquid in the deformed preform.

According to the embodiment shown in the figures, the additional vibratory device 63 is used during at least a part of the injection step to vibrate the liquid circulating in the injection circuit 56 such that the vibrations are transmitted to the inner wall of the preform 2 by the liquid injected in the preform 2. Indeed, vibrating the liquid during the injection step helps to compensate the cooling of the inner wall of the preform 2 due to the temperature of the injected liquid by causing a heating of the inner wall of the preform thanks to the vibration, as described previously.

According to an embodiment, the additional vibratory device 63 having a vibratory part 60 extending in the liquid injection circuit 56 is actuated during at least a part of the low pressure injection phase, i.e. while the liquid is injected at the first pressure $P_1$.

According to another preferred embodiment, when a high pressure injection phase takes place, the additional vibratory device 63 having a vibratory part 60 extending in the liquid injection circuit 56 is actuated during at least a part of the high pressure injection phase, i.e. while the liquid is injected at the second pressure $P_2$. This embodiment is particularly advantageous because the vibrations are used to bring heating energy to the inner wall of the preform 2 at the end of the injection step, i.e. when the preform has been substantially cooled down by the liquid injected in the preform, i.e. when the heating energy is most needed. Furthermore, during the high pressure injection phase, the flow rate of the liquid injected in the preform is reduced, thereby reducing the appearance of cavitation inside the liquid in the preform, which improves the transmission of vibrations inside the liquid.

During the high-pressure injection phase, the major part of the container is already urged against and in contact with the mould cavity 20. As the parts in contact with the mold cavity 20 are in abutment against the very rigid mold cavity 20, these parts do not vibrate. The only parts of the preform wall subjected to vibration are the remaining free parts not already urged against the cavity 20. Advantageously, the vibration frequency can be selected as to correspond to the mechanical resonance of the remaining free parts. Therefore, the vibration frequency used during the high-pressure injection phase may be different from the frequency used at the beginning of the injection phase. One advantage of this embodiment is that the vibration energy is mainly or only directed to the remaining free parts. This may reduce the holding time and forming time. However, the vibration frequency may be selected to optimize other parameters as will be described subsequently.

According to another embodiment, the liquid is vibrated during both the low pressure injection phase and the high pressure injection phase.

Consequently, according to the embodiment shown in the figures, the stretch rod 50 can be used to bring energy to the inner wall of the preform during the stretching phase while the additional vibratory device 63 is used during the injection step, for example during the high pressure injection step. By bringing energy in a continuous manner to the inner wall of the preform, it is ensured that the preform remains in a malleable state during the complete forming step.

It should be noted that the stretch rod 50 can also be used to vibrate the liquid inside the preform 2 after the stretching phase. This is particularly advantageous if the second pressure $P_2$ is applied while the injection of liquid is stopped. This can be obtained by closing the sealing barrier formed by the seal ring 44 once the container has reached its intermediary shape and once the closed volume extending below the seal ring 44 is full of liquid and by moving the stretch rod 50 through the port 54 in said closed volume, such that the volume of the stretch rod 50 in the closed volume increases. Such an increase causes an increase in the pressure inside the closed volume. Said increase can be set such that the second pressure $P_2$ is applied inside the container having its intermediary shape. In this case, the liquid in the chamber cannot be used to transmit vibrations to the wall of the container. Vibrating the stretch rod 50 in the liquid filling the closed volume can, in this case, bring energy to the inner wall of the preform 2 since the vibrations of the stretch rod 50 are transmitted to the inner wall of the preform 2 by the liquid in the closed volume.

As mentioned previously, the vibratory device(s) are controlled by the control device 62 in synchronisation with the other parts of the forming and filling station 4. If needed, the frequency and/or the amplitude of the vibrations emitted by the vibratory device(s) can be modified during the actuation of the vibratory device(s).

It should be noted that the vibrations of the inner wall of the preform will occur in parts of the preform that are not in contact with the wall of the mold cavity 20, the vibrations of the wall of the preform being absorbed in the parts that are in contact with the wall of the mold cavity 20. In other words, the vibrating of a part of the wall 15 of the preform 2 is stopped when said part of the wall 15 comes into contact with the wall of the mold 16 during the forming step. Such a phenomenon is satisfactory since only the parts not in contact with said mold cavity 20 require a deformation, the other parts of the container being finished since they comply with the shape of the mold cavity 20.

Consequently, the vibratory device(s) used during the forming step of the container allows forming filled containers which are satisfactory in terms of shape, of mechanical and/or thermal resistance and/or in terms of gas permeability.

Figure 7:
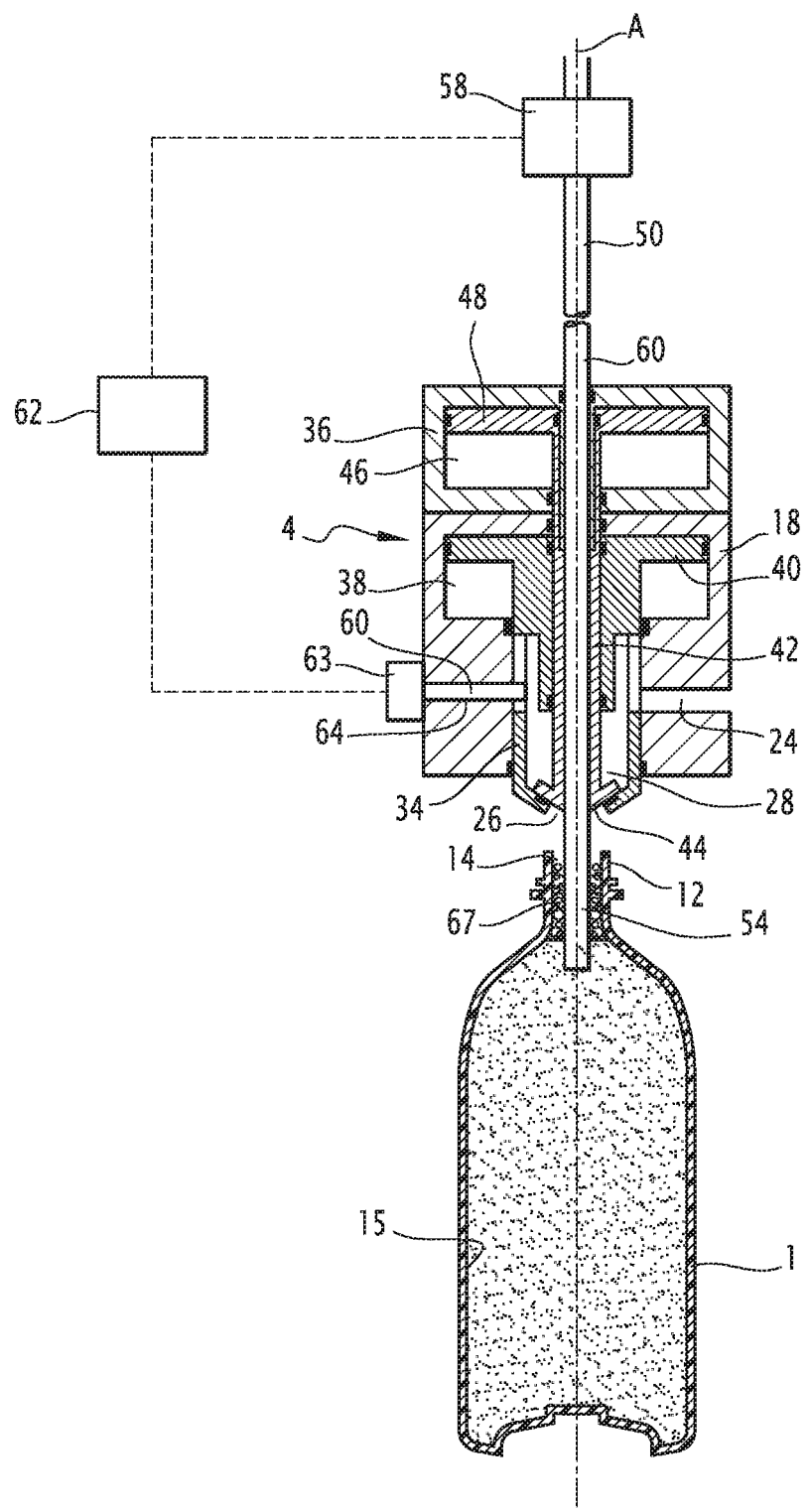
FIG. 7 is a diagrammatical cross-section view of part of the forming station during the suppression of foam from the neck of a container.

The vibratory device 58 having the stretch rod 50 as the vibratory part 60 can also be used during the filling of the container and once the container is filled to perform a "de-foaming" operation at the end of the forming step, as shown in FIG. 7. By vibrating the stretch rod 50 while the stretch rod is being retracted, the air above the liquid filling the container is vibrated, which destroys the gas bubbles 67 that can be formed in the neck 12 of the container by the liquid injected and causes the foaming to stop. This is particularly advantageous when the injected liquid is a carbonated liquid, containing gas bubbles. Consequently, the vibratory device 58 can be used to prevent the spilling of the liquid out of the container due to foaming. The vibratory device 58 can be actuated during an end step, wherein the outlet 26 of the injection device 18 is retrieved from the formed container at the end of the injection step while the stretch rod 50 is still inside the liquid as shown in FIG. 7 and/or when the tip of the stretch rod 50 is out of the liquid and extends above the liquid in the container to vibrate the air above said liquid.

The vibratory device(s) 58 can also be used during the cleaning of the injection device 18 described above, as will now be described in reference to FIG. 8.

Figure 8:
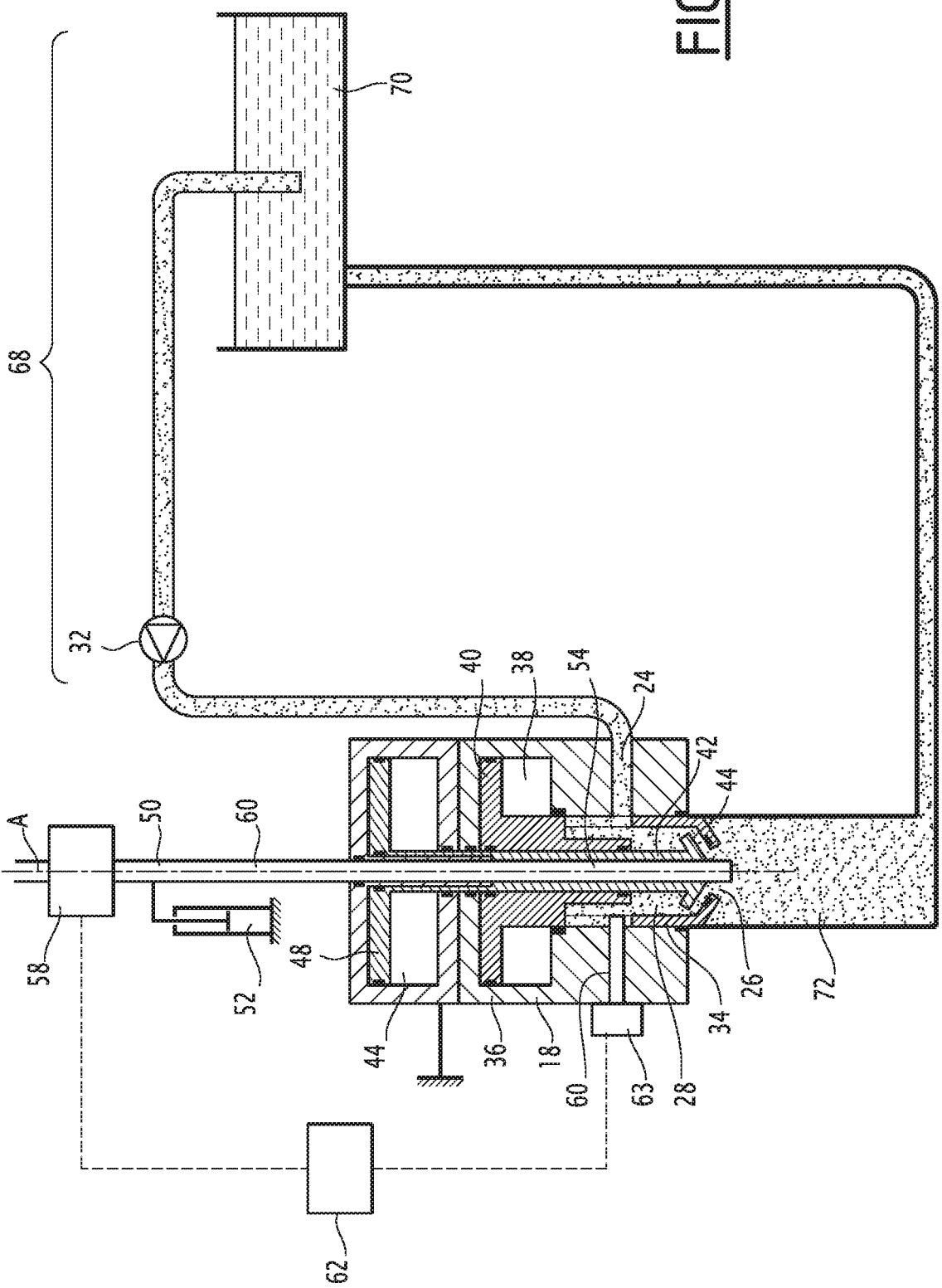
FIG. 8 is a diagrammatical cross-section view of part of an assembly comprising a forming station according to the invention during a cleaning step of said forming station.

For cleaning the injection device 18, the inlet 24 of the injection device is placed in fluidic communication with a source 68 of cleaning liquid 70, via the pressurization means 32, and the outlet 26 of the injection device 18 is placed in fluidic communication with a cleaning liquid collecting container 72, as shown in FIG. 8.

The liquid collecting container 72 is for example formed by a "dummy container", for example connected to the source of cleaning liquid 70 in order to form a close circuit for circulating the cleaning liquid through the injection device 18. The pressurization means 32 may be used here at a low pressure sufficient to circulate the cleaning liquid.

The control rod 42 is placed in its opened position and the cleaning liquid is injected in the chamber 28 via the inlet 24 and the pressurization means 32. Consequently, the cleaning liquid flows through the chamber 28, exit the injection device 18 through the outlet 26 and flow inside the dummy container 72, thereby cleaning the liquid injection circuit 56.

By actuating the additional vibratory device 63 having a vibrating part 60 extending the liquid injection circuit 56, it is possible to assist in the cleaning of the injection device 18 since the vibrations can help detaching adhering parts, for example tacky elements from the forming and filling liquid used to form and fill containers 1, from the wall of the liquid injection circuit 56. The vibratory device 58 having the stretch rod 50 as the vibrating part 60 can also be used to vibrate the cleaning liquid.

The invention claimed is:

1. A forming station for forming a container from a preform by injecting a forming fluid in the preform, the forming station comprising:
    a source of pressurized forming fluid,
    an injection device comprising an inlet in fluidic communication with the source of pressurized forming fluid and an outlet in fluidic communication with the inlet and through which the forming fluid is intended to be injected into the preform,
    a stretch rod movable in translation according to the axis of the stretch rod relative to the outlet and arranged to assist axial deformation of the preform during a stretching phase,
    wherein the forming station further comprises a vibratory device connected to the stretch rod and arranged to vibrate the stretch rod when said vibratory device is actuated, and a control device arranged to actuate the vibratory device during at least a part of the stretching phase.

2. The forming station according to claim 1, further comprising a mold defining a mold cavity of a shape of the container to be formed, said mold being arranged to receive the preform such that the preform acquires the shape of the mold cavity when the pressurized forming fluid is injected into the preform, the stretch rod being movable inside the mold cavity during the stretching phase.

3. The forming station according to claim 1, wherein the vibratory device is a piezoelectric actuator mechanically coupled to the stretch rod, the control device controlling the actuation of the piezoelectric actuator and at least one of a vibration frequency and a vibration amplitude of the piezoelectric actuator.

4. The forming station according to claim 1, wherein the forming station is also a liquid filling station, wherein the source of pressurized forming fluid is a source of pressurized liquid comprising a source of liquid and pressurizing device located downstream the source of liquid and arranged to pressurize the liquid from the liquid source, a liquid injection circuit connecting the pressurizing device to the outlet, the outlet of the injection device being at the downstream end of the liquid injection circuit.

5. The forming station according to claim 4, further comprising an additional vibratory device comprising a vibrating part extended in the liquid injection circuit, such that the vibrating part is in contact with the pressurized liquid flowing in the liquid injection circuit.

6. A method of forming a container from a preform using a forming station having mold defining a mold cavity in a shape of the container to be formed, a source of pressurized forming fluid, an injection device including an inlet in fluidic communication with the source of pressurized forming fluid and an outlet in fluidic communication with the inlet and through which the forming fluid is intended to be injected into the preform, a stretch rod movable in translation according to an axis of the stretch rod relative to the outlet and arranged to assist axial deformation of the preform during a stretching phase, a vibratory device connected to the stretch rod and arranged to vibrate the stretch rod when the vibratory device is actuated, and a control device arranged to actuate the vibratory device during at least a part of the stretching phase, said method comprising the steps of:
    placing a preform in a malleable state in fluidic communication with the outlet of the forming station, an axis of the preform being substantially aligned with the axis of the stretch rod,
    moving in translation the stretch rod relative to the outlet along an axial direction during a stretch rod displacement step; the axial direction being defined by the axis of the stretch rod; the stretch rod displacement step including an approaching phase ending when the stretch rod contacts a bottom wall of the preform, followed by a stretching phase during which the stretch rod expands the preform according to the axial direction,
    injecting the forming fluid in the preform through the outlet to expand the preform until it acquires the shape of the container to be formed,
    actuating the vibratory device during at least a part of the stretching phase such that vibrations of the stretch rod are communicated to the preform resulting in at least one of heating the preform or reducing a cooling speed of the preform.

7. The method according to claim 6, wherein the moving of the stretch rod during the stretching phase ends when a bottom wall of the preform contacts a bottom wall of the mold cavity, the control device ending actuating of the vibratory device when the bottom wall of the preform contacts the bottom wall of the mold cavity.

8. The method according to claim 6, wherein the pressurized forming fluid is a liquid, and the injecting of the pressurized forming fluid comprises a low pressure injection phase where the liquid is injected into the preform at a first pressure until the preform acquires an intermediary shape and also comprises high pressure injection phase occurring after the low pressure injection phase where the liquid is injected inside the preform having the intermediary shape at a second pressure until the preform acquires the final shape of the container to be formed, the second pressure being greater than the first pressure.

9. The method according to claim 8, wherein the low pressure injection phase occurs until the intermediary shape presents a volume corresponding to between 90% and 98% of a final volume of the container to be shaped, the high pressure phase occurring such that the volume of the intermediary shape further increases by 2% to 10% of the final volume of the container to be shaped in order to obtain a final shape of the container.

10. The method according to claim 8, wherein an additional vibratory device is actuated during at least a part of the low pressure injection phase such that vibrations of the additional vibratory device are communicated to the preform by the liquid resulting in one of heating of the preform and reducing a cooling speed of the preform.

11. The method according to claim 10, wherein the additional vibratory device is actuated during at least a part of the high pressure injection phase such that the vibrations of the additional vibratory device are communicated to at least a part of the preform body not already urged against the mold cavity.

12. The method according to claim 10, wherein the low pressure injection phase starts during the stretching phase, the additional vibratory device being actuated at an end of the stretching phase once actuation of the vibratory device connected to the stretch rod has stopped or being actuated while the vibratory device connected to the stretch rod is still actuated.

13. The method according to claim 6, wherein the pressurized forming fluid is a liquid, and the injecting of the forming fluid simultaneously fills the formed container, the method further comprising an end step, wherein the outlet of the injection device is retracted from a formed container at the end of the injection step, and wherein the vibratory device is actuated during the end step.

14. The method according to claim 13, wherein the vibratory device is actuated while the stretch rod remains in the liquid filling the container.

15. The method according to claim 6, further comprising a step of placing the inlet in fluidic communication with a cleaning liquid source and the outlet in fluidic communication with a cleaning liquid collecting container and a cleaning step of circulating the cleaning liquid in the liquid injection circuit, wherein at least one of the vibratory device and the additional vibratory device are actuated during at least part of the cleaning step.

16. The method according to claim 13, wherein the vibratory device is actuated when the stretch rod comes out of the liquid.

* * * * *